(No Model.)
W. MAIN.
POWER TRANSMITTING DEVICE.
No. 407,090. Patented July 16, 1889.
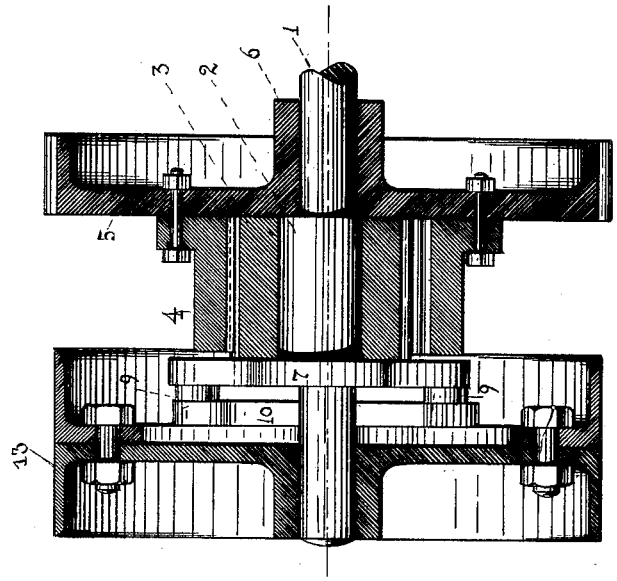
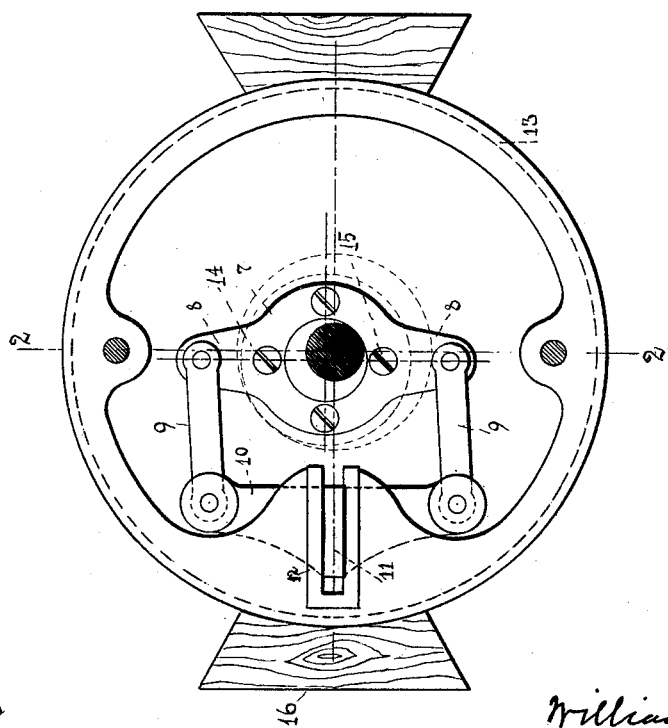
Witnesses
J. J. Kennedy
T. H. Palmer
Inventor
William Main
By his Attorneys Philipp, Philipp & Strong

UNITED STATES PATENT OFFICE.

WILLIAM MAIN, OF BROOKLYN, NEW YORK.

POWER-TRANSMITTING DEVICE.

SPECIFICATION forming part of Letters Patent No. 407,090, dated July 16, 1889.

Application filed June 13, 1888. Serial No. 276,985. (No model.)

*To all whom it may concern:*

Be it known that I, WILLIAM MAIN, a citizen of the United States, residing at Brooklyn, county of Kings, and State of New York, have invented certain new and useful Improvements in Power-Transmitting Devices, fully described and represented in the following specification and the accompanying drawings, forming a part of the same.

The object of my invention is to provide a simple and compact device for transmitting motion from a power-shaft or the like to mechanism to be driven thereby.

My invention relates to the application for the transmission of power of what is known as the "Watt sun-and-planet gear" by means of mechanically-practical mountings and connections in such manner as to impart motion to the driven mechanism only when the oscillating member of said gear is restrained to constant parallelism by means of a connection or guide mechanism extending from the oscillating gear to a guide-bearing, which guide-bearing moves with it when the power is not being transmitted, but may be restrained or retarded so as to throw the driving and driven mechanism into operative connection, and in such manner that uniformity of speed shall be imparted to the driven mechanism. In another application, filed June 13, 1888, Serial No. 276,982, I have shown and described a variety of mechanisms embodying my invention, and have explained at length the character of the said mechanism generically considered.

My present application has for its object the protection by Letters Patent of my invention, embodied in mechanism wherein the connection or guide governing the action of the oscillating gear consists of a combination of parts having both a swinging motion and a sliding motion.

In other applications filed of even date herewith I have described and claimed specifically my invention applied in connection with the other types of guides mentioned in the said generic application No. 276,982, and in still another application, filed of even date herewith, I have claimed the method involved in the practice of my invention. These subject-matters I therefore do not claim in this application.

An important part of my invention, generically considered, and which I claim here, in combination with the particular form of guide herein shown and claimed, consists of a bearing for the guide, which normally rotates in unison with the driving-gear of the sun-and-planet series of gear-wheels, but which may be restrained or retarded so as to throw the driving and driven mechanism into operative connection. The restraint or retardation of this bearing may be gradually accomplished by a friction-brake or other suitable device, and the power of the shaft and the momentum stored up in its rotating connections may thus be gradually and without shock or jar transferred to the driven mechanism.

In the drawings forming a part of this specification and illustrating one general type of my invention, Figure 1 is a side elevation, the outer half of the brake-pulley being removed, and Fig. 2 a central section on the line 2 2 of Fig. 1.

The shaft 1 is a driving-shaft adapted to be operated from any convenient source of power, and it carries fast upon it an eccentric 2, which moves freely within a circular opening in the oscillating gear-wheel 3, which constitutes the initial member of the sun-and-planet series. Outside of and about this gear-wheel is an annular gear 4, concentric with the driving-shaft 1 and bolted to the web 5 of a power-transmitting pulley mounted by means of a hollow sleeve or hub 6 upon the driving-shaft and from which the power is conveyed by any appropriate connections to the driven machinery. I apply to this pulley the term "driven mechanism," intending to include thereunder any device to which the power transmitted through the gear-wheels may be applied, the pulley shown being merely an illustration of one form of such driven mechanism. To the oscillating gear-wheel 3 is rigidly attached a plate 7, provided with lugs 8, from which connection is made by links 9 with a block 10, which block is provided with a lug or projection 11 playing between guiding-surfaces 12 upon a pulley 13, mounted upon and rotating about the main shaft.

The oscillating gear-wheel 3 and the pulley 13 will maintain fixed positions relative to each other as regards rotation, their absolute relative positions changing as the shaft 1 revolves to the extent of the sliding motion of the block 10 with reference to the plate 7, and of the plate 7 with reference to the pulley 13, caused by the eccentric position of the gear 3 with reference to the axis of the pulley 13. The block 10, its links 9, and guiding-surfaces 12 constitute what I term "a guide connecting the gear-wheel 3 with the pulley 13," this pulley constituting a bearing for the guide by the restraint of which the rotation of the gear-wheel 3 about its own center is controlled. Consequently when the pulley 13 is free to revolve about its axis the gear 3 is also free and will convey no power from the shaft 1 to the outer gear 4. When, however, the pulley is locked or held fast in one position, the gear 3 will be carried about by the eccentric in a position constantly parallel to itself and will communicate to the outer gear 4 a rotating motion reduced to an extent dependent upon the ratio between the two gears.

The amount of this reduction may be readily calculated according to well-known rules which require no special explanation. In other words, the line of the governing-points of the gear 3, which in this case we may conceive to be the screws 14 and 15 passing through the plate 7 into the gear-wheel 3, (see Fig. 1,) is constrained to always maintain as the gear 3 oscillates positions of parallelism with reference to a fixed line, (represented in this case by a line connecting the lugs 17 18 on the pulley 13,) the mechanism effecting the constraint being the block 10, its sliding guide connection with the pulley and its link connections to the plate fixed to the oscillating gear-wheel 3, which taken together, as before stated, I term a "guide."

Brakes of any suitable construction are required to control the pulley 13 in order to effect transmission of power through the gears, and I have shown two brake-shoes 16 applied to the pulley in Fig. 1.

The preferable sort of motion for the guide-bearing illustrated in this machine by the pulley 13 is rotatory, since it permits a convenient application of brakes, and thereby the speed of power-transmission may be varied within wide limits, depending upon the amount of pressure applied to the brakes. I do not confine myself, however, in claiming this invention to a rotary guide-bearing or the use of friction-brakes, but have shown these several devices as convenient forms of construction; neither do I confine myself to the particular form of those parts which constitute the connections between the oscillating gear and the abutment, since these forms may be indefinitely varied while maintaining the double sliding and swinging motion in a plane perpendicular to the axis of rotation of the oscillating gear-wheel.

I wish it understood that the broad scope of the invention to which I lay claim in the present application embraces the use of any form of mechanism constituting a guide, the parts thereof having a sliding motion in one direction and a swinging motion in another direction, said motions being in a plane perpendicular to the axis of rotation of the oscillating member of a series of gear-wheels and connecting that member with a restrainable guide-bearing.

I do not confine myself to that form of sun-and-planet gear in which the driving member is within the driven member. The driving member may be without, as in the original invention of Watt. So, too, the power may be transmitted with an increase as well as with a reduction of speed. Nor do I limit myself to a sun-and-planet system in which there are but two gears. There may be intermediate gear-wheels between the driving and driven gears, and the restraining mechanism may be applied to any one of these gear-wheels.

It is plain that there will be no substantial difference between the construction shown and one wherein the links connected the block 10 with the pulley instead of with the plate 7 and gear-wheel 3, and wherein the sliding movement was between the block and the gear-wheel instead of between the block and the pulley.

Having thus described my invention, what I claim, and desire to secure by Letters Patent of the United States, is—

1. A power-transmitting device for connecting a driving-shaft with a driven mechanism, consisting of a series of gear-wheels, one of said gear-wheels having a rotary and also an oscillating motion, a restrainable guide-bearing normally rotating with said oscillating wheel, and a guide for restraining the rotary motion of said oscillating wheel when the guide-bearing is restrained, said guide being made up of parts having a swinging motion in one direction and a sliding motion in another direction, said motions being in a plane perpendicular to the axis of rotation of the oscillating gear-wheel, substantially as described.

2. A power-transmitting device for connecting a driving-shaft with a driven mechanism, consisting of a series of gear-wheels, one of said gear-wheels having a rotary and also an oscillating motion, a restrainable guide-bearing normally rotating with said oscillating wheel, a guide for restraining the rotary motion of said oscillating wheel when the guide bearing is restrained, said guide being made up of parts having a swinging motion in one direction and a sliding motion in another direction, said motions being in a plane perpendicular to the axis of rotation of the oscillating gear-wheel, and a brake for restraining the rotation of said guide-bearing, substantially as described.

3. A power-transmitting device for connecting a driving-shaft with a driven mechanism, consisting of a series of gear-wheels, one of said gear-wheels having a rotary and also an oscillating motion, a restrainable guide-bearing normally rotating with said oscillating wheel, and a guide for restraining the rotary motion of said oscillating wheel when the guide-bearing is restrained, said guide being made up of a connecting-piece joined to the oscillating wheel by pivoted links and playing along guiding-surfaces attached to the guide-bearing, substantially as described.

4. A power-transmitting device for connecting a driving-shaft with a driven mechanism, consisting of a series of sun-and-planet gear-wheels, a restrainable guide-bearing normally rotating with the oscillating member of said gear-wheels, and a guide for restraining the rotary motion of said oscillating member when the guide-bearing is restrained, said guide being made up of parts having a swinging motion in one direction and a sliding motion in another direction, said motions being in a plane perpendicular to the axis of rotation of the driving member of the gear, substantially as described.

5. A power-transmitting device for connecting a driving-shaft with a driven mechanism, consisting of a series of sun-and-planet gear-wheels, a restrainable guide-bearing normally rotating with the oscillating member of said gear-wheels, a guide for restraining the rotary motion of said oscillating member when the guide-bearing is restrained, said guide being made up of parts having a swinging motion in one direction and a sliding motion in another direction, said motions being in a plane perpendicular to the axis of rotation of the driving member of the gear, and a brake for restraining the movement of said guide-bearing, substantially as described.

6. A power-transmitting device for connecting a driving-shaft with a driven mechanism, consisting of a series of sun-and-planet gear-wheels, a restrainable guide-bearing normally rotating with the oscillating member of said gear-wheels, and a guide for restraining the rotary motion of said oscillating member when the guide-bearing is restrained, said guide being made up of a connecting-piece joined to the driving member of the gear by links and playing along guiding-surfaces attached to the guide-bearing, substantially as described.

7. A power-transmitting device for connecting a driving-shaft with a driven mechanism, consisting of a series of sun-and-planet gear-wheels, a restrainable guide-bearing normally rotating with the oscillating member of said gear-wheels, a guide for restraining the rotary motion of said oscillating member when the guide-bearing is restrained, said guide being made up of a connecting-piece joined to the oscillating member of the gear by links and playing along guiding-surfaces attached to the guide-bearing, and a brake for restraining the rotation of said guide-bearing, substantially as described.

8. A power-transmitting device for connecting a driving-shaft with a driven mechanism, consisting of a series of sun-and-planet gear-wheels, the oscillating member of said sun-and-planet gear-wheels being mounted within the other member, a restrainable guide-bearing normally rotating with said oscillating gear-wheel, and a guide for restraining the rotary motion of said oscillating gear-wheel when the guide-bearing is restrained, said guide being made up of parts having a swinging motion in one direction and a sliding motion in another direction, said motions being in a plane perpendicular to the axis of rotation of the oscillating gear, substantially as described.

9. A power-transmitting device for connecting a driving-shaft with a driven mechanism, consisting of a series of sun-and-planet gear-wheels, the oscillating member of said sun-and-planet gear-wheels being mounted within the other member, a restrainable guide-bearing normally rotating with said oscillating gear-wheel, a guide for restraining the rotary motion of said oscillating gear-wheel when the guide-bearing is restrained, said guide-bearing being made up of parts having a swinging motion in one direction and a sliding motion in another direction, said motions being in a plane perpendicular to the axis of rotation of the oscillating gear, and a brake for restraining the rotation of said guide-bearing, substantially as described.

10. A power-transmitting device for connecting a driving-shaft with a driven mechanism, consisting of a series of sun-and-planet gear-wheels, the oscillating member of said gear-wheels being mounted within the other member, a restrainable guide-bearing normally rotating with said oscillating gear-wheel, and a guide for restraining the rotary motion of said oscillating wheel when the guide-bearing is restrained, said guide being made up of a connecting-piece joined to the oscillating gear-wheel by links, and moving along guiding-surfaces upon the guide-bearing, substantially as described.

11. A power-transmitting device for connecting a driving-shaft with a driven mechanism, consisting of a series of sun-and-planet gear-wheels, the oscillating member of said gear-wheels being mounted within the other member, a restrainable guide-bearing normally rotating with said oscillating gear-wheel, a guide for restraining the rotary motion of said oscillating wheel when the guide-bearing is restrained, said guide being made up of a connecting-piece joined to the oscillating gear-wheel by links and moving along guiding-surfaces upon the guide-bearing, and a brake for restraining the rotation of said guide-bearing, substantially as described.

12. A power-transmitting device for connecting a driving-shaft with a driven mechanism, consisting of a series of sun-and-planet gear-wheels, the oscillating member of said sun-and-planet gear-wheels being mounted upon an eccentric formed upon the driving-shaft, a restrainable rotatory pulley loosely mounted upon the driving-shaft and normally rotating with said oscillating wheel, a guide for restraining the rotatory motion of said oscillating wheel when the guide-bearing is restrained, said guide consisting of a block connected to the said oscillating wheel by links and playing along guiding-surfaces upon the pulley, and a brake for restraining the rotation of said pulley, substantially as described.

In testimony whereof I have hereunto set my hand in the presence of two subscribing witnesses.

WILLIAM MAIN.

Witnesses:
T. H. PALMER,
J. J. KENNEDY.